(12) United States Patent
Soman et al.

(10) Patent No.: US 11,877,059 B2
(45) Date of Patent: Jan. 16, 2024

(54) SENSOR-BASED IMAGE VERIFICATION

(71) Applicant: QUALCOMM Incorporated, San Diego, CA (US)

(72) Inventors: Mehul Soman, San Jose, CA (US); Diyan Teng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/196,516

(22) Filed: Mar. 9, 2021

(65) Prior Publication Data
US 2022/0294987 A1    Sep. 15, 2022

(51) Int. Cl.
*H04N 23/68* (2023.01)

(52) U.S. Cl.
CPC ....... *H04N 23/6811* (2023.01); *H04N 23/683* (2023.01)

(58) Field of Classification Search
CPC .................. H04N 5/23254; H04N 5/23267
See application file for complete search history.

(56) References Cited

U.S. PATENT DOCUMENTS

| 10,580,149 | B1* | 3/2020 | Lakshminarayanan | ...................... G06F 3/0412 |
| 2011/0109755 | A1 | 5/2011 | Joshi et al. | |
| 2011/0279649 | A1* | 11/2011 | Choi | ...................... H04N 13/239 348/208.99 |
| 2017/0053164 | A1* | 2/2017 | Eagleton | ............ H04N 1/32309 |
| 2017/0195596 | A1* | 7/2017 | Vogelsang | ............. H04N 5/343 |
| 2020/0380266 | A1* | 12/2020 | Nadathur | ............... G06V 20/46 |
| 2021/0385383 | A1* | 12/2021 | Kim | ........................ G06T 5/001 |
| 2022/0174216 | A1* | 6/2022 | Ozone | ................ H04N 5/23258 |

FOREIGN PATENT DOCUMENTS

WO    WO-2016207899 A1    12/2016

OTHER PUBLICATIONS

International Search Report and Written Opinion—PCT/US2022/070225—ISA/EPO—dated Apr. 14, 2022.
Matthias K., et al., "Impeding Forgers at Photo Inception", Algorithms and Technologies for Multispectral, Hyperspectral, and Ultraspectral Imagery Xix—Proceedings of SPIE, vol. 8665, Feb. 21, 2013 (Feb. 21, 2013), p. 866504, XP055906081, US, ISSN: 0277-786X, DOI: 10.1117/12.2008412 ISBN: 978-1-5106-4548-6, Retrieved from the Internet: URL: http://www.icsi.berkeley.edu/pubs/vision/impedingforgers13.pdf. [Retrieved on Mar. 29, 2022] The Whole Document.

* cited by examiner

*Primary Examiner* — Christopher K Peterson
(74) *Attorney, Agent, or Firm* — QUALCOMM Incorporated

(57) ABSTRACT

In some aspects, a device may receive measured camera motion information associated with an image. The device may generate a shared image based on the image. The device may apply, based on the measured camera motion information, an image stabilization process to the image to generate a true image. The device may store the true image in a memory associated with the device. The device may provide the shared image and the measured camera motion information to another device. Numerous other aspects are described.

31 Claims, 7 Drawing Sheets

SENSOR-BASED IMAGE VERIFICATION

FIELD OF THE DISCLOSURE

Aspects of the present disclosure generally relate to image verification and, for example, to sensor-based image verification.

BACKGROUND

Image verification techniques may be used to determine if an image is a fake image. A fake image may be generated by manipulating or modifying an image or may be manufactured using a software tool.

SUMMARY

In some aspects, a method includes receiving, by a device, measured camera motion information associated with an image; generating, by the device, a shared image based on the image; applying, by the device and based on the measured camera motion information, an image stabilization process to the image to generate a true image; storing, by the device, the true image in a memory associated with the device; and providing, by the device, the shared image and the measured camera motion information to another device.

In some aspects, a device includes one or more memories and one or more processors, communicatively coupled to the one or more memories, configured to: receive, from at least one sensor, measured camera motion information associated with an image; generate a shared image based on the image; apply, based on the measured camera motion information, an image stabilization process to the image to generate a true image; store the true image in a memory associated with the device; and provide the shared image and the measured camera motion information to another device.

In some aspects, a non-transitory computer-readable medium storing a set of instructions includes one or more instructions that, when executed by one or more processors of a device, cause the device to: receive, from at least one sensor, measured camera motion information associated with an image; generate a shared image based on the image; apply, based on the measured camera motion information, an image stabilization process to the image to generate a true image; store the true image in a memory associated with the device; and provide the shared image and the measured camera motion information to another device.

In some aspects, an apparatus includes means for receiving, from at least one sensor, measured camera motion information associated with an image; means for generating a shared image based on the image; means for applying, based on the measured camera motion information, an image stabilization process to the image to generate a true image; means for storing the true image in a memory associated with the apparatus; and means for providing the shared image and the measured camera motion information to a device.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
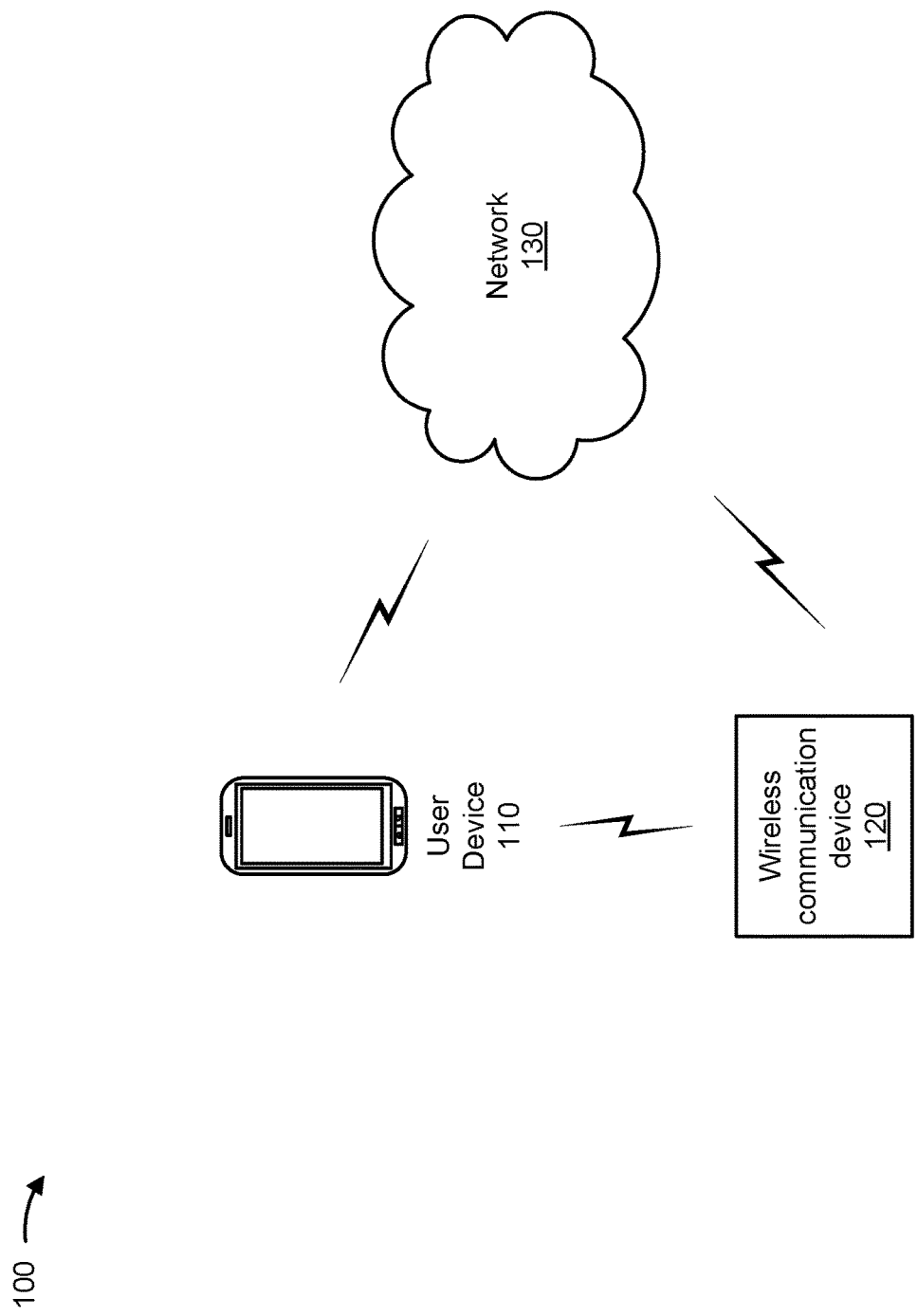
FIG. 1 is a diagram illustrating an example environment in which sensor-based image verification described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Commonly, user devices and/or wireless communication devices include image capture devices (e.g., a camera and/or a video camera, among other examples) for capturing an image (e.g., a still image, video, and/or another type of image). The proliferation of these image capture devices has made it easier and more convenient for a user to capture an image. As a result, the use of images has increased. For example, a user may post an image to a social media web site, a financial institution may allow customers to deposit checks by providing an image of the check to the financial institution via an application executing on a user device and/or a wireless communication device, an entity (e.g., a business, a government agency, and/or another type of entity) may allow users to submit an image of a document (e.g., a birth certificate, a driver's license, a sales contract, and/or the like) via a web site to conduct a transaction and/or apply for a service, among other examples.

In some cases, an owner of an image (e.g., a person capturing the image, a person submitting an image to an entity) and/or a person or entity receiving or viewing the image may wish to verify that the image is authentic (e.g., not a fake image). For example, a financial institution may wish to verify the authenticity of an image of a check, a government agency may wish to verify the authenticity of an image of a birth certificate, and/or the like.

Some image verification techniques may use a software tool that determines whether an image is a fake image based on image quality, image context (e.g., a direction of a shadow relative to a position of a light source, metadata indicating a location at which the image was captured corresponding with objects included in the image, and/or the like), and/or face lighting, among other examples. However, a software tool used to generate a fake image may be configured to ensure that image quality, image context, and/or face lighting depicted in the fake image corresponds to the image quality, image context, and/or face lighting depicted in the authentic image. Further, the information required to determine image quality, image context, and/or face lighting, such as a position of a light source relative to an object in the image, a location at which the image was captured, and/or the like, may not be available to the person attempting to verify an image.

Some implementations described herein relate to a sensor-based image verification device configured to verify the authenticity of an image and/or to detect a fake image. For example, the image verification device may receive measured camera motion information associated with an image. The image verification device may generate a shared image based on the image. The image verification device may apply, based on the measured camera motion information, an image stabilization process to the image to generate a true image and may store the true image in a memory associated with the image verification device.

By utilizing the measured camera motion information to apply the image stabilization process, the image verification process may increase a complexity associated with generating a fake image. For example, the measured camera motion information may include sensor data associated with the movement of the image capture device while the image is being captured, which may be difficult to determine and/or replicate.

The image verification device may provide the shared image and the measured camera motion information to another device. For example, the image verification device may include the measured camera motion information in metadata associated with the shared image. By including the measured camera motion information in the metadata, the measured camera motion information may be readily available to be used to verify the image, as described in greater detail below.

To verify the image, the image verification device may receive the shared image and may extract the measured camera motion information from the metadata. The image verification device may apply, based on the measured camera motion information, the image stabilization process to the shared image to generate a verification image. The image verification device may compare the verification image and the true image and may verify an authenticity of the shared image and/or determine whether the shared image is a fake image based on the comparison. For example, the image verification system may verify the shared image when pixel data associated with the verification image matches pixel data associated with the true image.

In this way, the image verification device may verify an image and/or detect a fake image. By verifying an image based on a comparison of a verification image and a true image, the image verification device may conserve computing resources (e.g., processor resources, memory resources, communication resources, and/or the like) that otherwise would have been utilized to execute one or more software tools configured to detect fake images based on image quality, image context, face lighting, and/or the like.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

User device 110 includes one or more devices capable of receiving, generating, storing, processing, and/or providing information associated with capturing and/or verifying an image, as described elsewhere herein. User device 110 may include a communication device and/or a computing device. For example, user device 110 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 110 may be a stand-alone device that includes an image verification device for verifying an image, as described elsewhere herein.

Similar to user device 110, wireless communication device 120 includes one or more devices capable of receiving, generating, storing, processing, and/or providing information associated with capturing and/or verifying an image, as described elsewhere herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
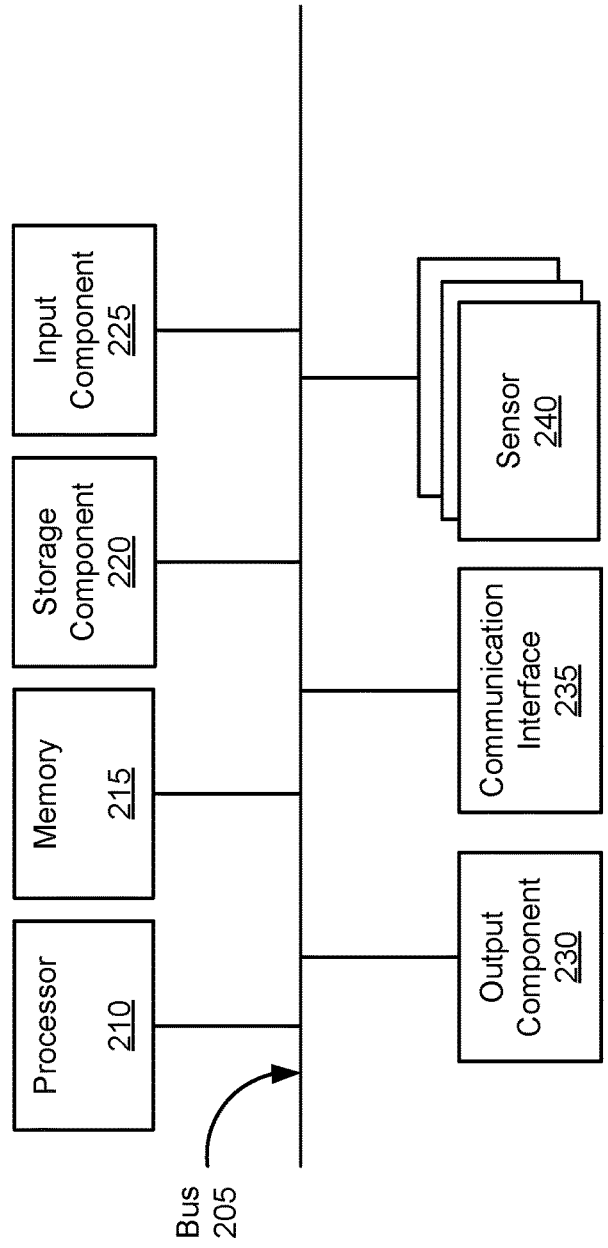
FIG. 2 is a diagram illustrating example components of one or more devices shown in FIG. 1, such as a user device and/or a wireless communication device, in accordance with the present disclosure.

FIG. 2 is a diagram illustrating example components of a device 200, in accordance with the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, and/or the like.

Bus 205 includes a component that permits communication among the components of device 200. Processor 210 is implemented in hardware, firmware, software, or a combination of hardware, firmware, and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts (mW) of power) that has always-on capability while device 200 is powered on.

Additionally, or alternatively, sensor 240 may include magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e.g, that uses triangulation, multi-lateration, and/or the like), and/or the like), a gyroscope (e.g., a micro-electro-mechanical systems (MEEMS) gyroscope or a similar type of device), an accelerometer, a speed sensor, a motion sensor, an infrared sensor, a temperature sensor, a pressure sensor, and/or the like.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving measured camera motion information associated with an image; means for generating a shared image based on the image; means for applying, based on the measured camera motion information, an image stabilization process to the image to generate a true image; means for storing the true image in a memory associated with the device; and means for providing the shared image and the measured camera motion information to another device. In some aspects, such means may include one or more components of device 200 described in connection with FIG. 2, such as bus 205, processor 210, memory 215, storage component 220, input component 225, output component 230, communication interface 235, sensor 240, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
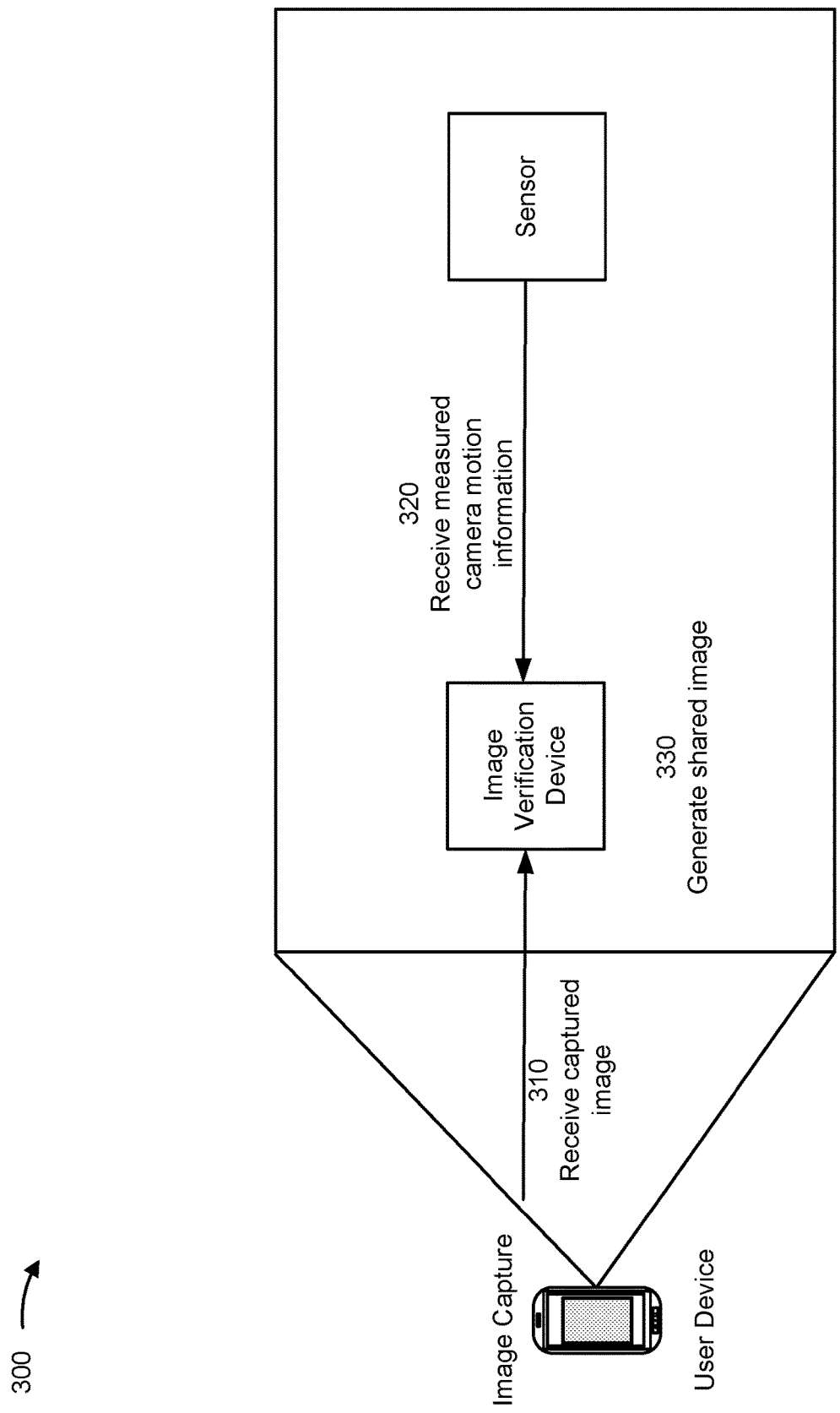
FIGS. 3A-3B and 4A-4B are diagrams illustrating examples associated with sensor-based image verification, in accordance with the present disclosure.
Figure 3B:
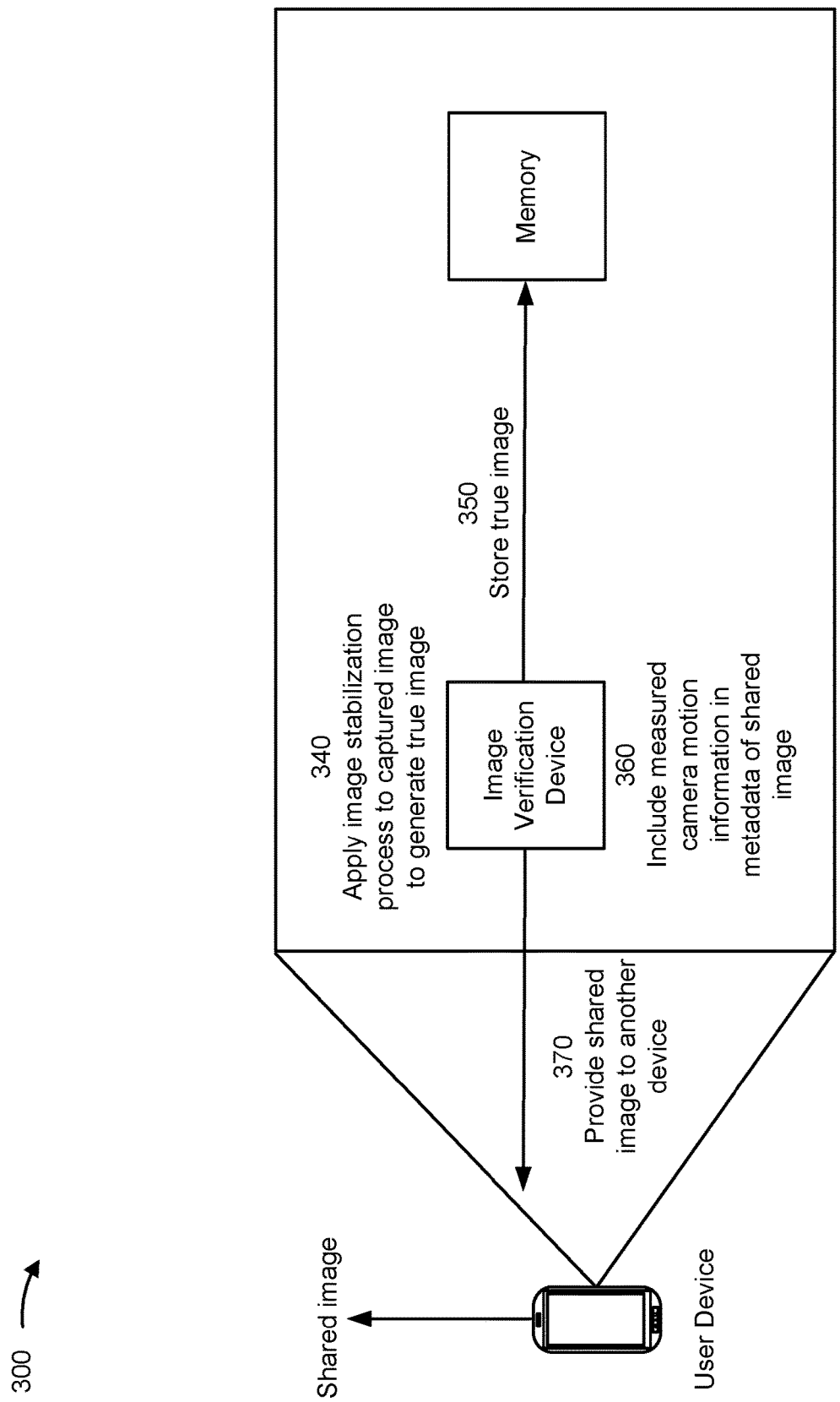

FIGS. 3A-3B are diagrams illustrating an example 300 associated with sensor-based verification of an image, in accordance with the present disclosure. As shown in FIG. 3A, example 300 includes a user device that is used to capture an image (e.g., an image of a document, as shown in FIG. 3A). For example, a user may utilize a camera of the user device to capture an image of a check via an application associated with a financial institution at which the user has an account.

The user device may include a sensor-based image verification device configured to verify an authenticity of a captured image based on measured camera motion information. As shown by reference number 310, the image verification device receives image data corresponding to the image captured by the image capture device. The image data may include one or more images, video, and/or the like captured by the image capture device.

As shown by reference number 320, the image verification device receives measured camera motion information from a sensor associated with the image verification device. The measured camera motion information may include data, obtained by one or more sensors of the user device, associated with a movement of the user device and/or the image capture device during a period of time associated with the image capture device capturing the image. For example, the measured camera motion information may include gyroscope information (e.g., an angular velocity of the user device and/or the image capture device) obtained by a gyroscope, acceleration information obtained by an accelerometer, information indicating whether a user is holding the user device while the image is captured, and/or the like.

Alternatively, and/or additionally, the image verification device may receive additional information associated with the image. For example, the image verification device may receive information indicating a time and/or a date at which the image is captured, information input by a user (e.g., information identifying an object in the image, information identifying a location associated with the image, and/or the like), location information (e.g., a latitude, a longitude, an address, a region, and/or the like) obtained by a location sensor (e.g., a global positioning system (GPS) device), information indicating one or more settings (e.g., an exposure time, a frame rate, a shutter speed, a focal length, and/or the like) of the image capture device, and/or another type of additional information associated with the image.

As shown by reference number 330, the image verification device generates a shared image. In some aspects, the image verification device generates the shared image based on the captured image. For example, the image verification device may generate a copy of the captured image. The image verification device may generate the copy of the captured image prior to applying an image stabilization process to the image, as described in greater detail below. In some aspects, the image verification device generates the copy of the captured image based on the captured image comprising a still image.

In some aspects, the image verification device generates the shared image based on a second captured image. For example, the image capture device may capture a second image of a view depicted in the initial captured image. The image capture device may capture the second image based on a setting and/or a user preference indicating that the second image is to be captured, based on a signal transmitted by the image verification device, and/or the like. In some aspects, the image verification device captures the second image based on the captured image comprising video.

Alternatively, and/or additionally, the image verification device may capture the second image based on an image exposure time associated with the captured image. For example, the image verification device may determine an image exposure time and a frame duration associated with the captured image based on the additional data received by the image verification device. The image verification device may determine that a difference between the image exposure time and the frame duration satisfies a threshold (e.g., greater than one-half of the frame duration). The image verification device may cause the image capture device to capture the second image during a remaining portion of the frame duration occurring after an expiration of the image exposure time based on the difference between the image exposure time and the frame duration satisfying the threshold.

As shown in FIG. 3B, and by reference number 340, the image verification device applies an image stabilization process to the captured image to generate a true image. The image stabilization process may counteract image blur caused by movement of the image camera device and/or jitter and/or compensate for rolling shutter distortions during image capture. The image stabilization process may compensate for effects of movement of the image camera device, including rotation (that may be determined based on gyroscope information obtained from a gyroscope, for example) and translation (that may be determined based on acceleration information obtained by an accelerometer, for example).

In some aspects, the image verification device applies an image stabilization process that includes optical image stabilization (OIS) and/or electronic image stabilization (EIS) to the image based on the measured camera motion information. For example, the image verification device may utilize an OIS algorithmic function and/or an EIS algorithmic function to generate angle data based on the measured camera motion information. The image verification device may determine a correction angle associated with the image based on the angle data and may apply the correction angle to the image.

As shown by reference number 350, the image verification device stores the true image in a memory of the user device. The image verification device may store the true image in a memory of the user device based on performing the image stabilization process on the image. In some aspects, the image verification device assigns an image identifier to the true image and associates the stored encryption key with the image identifier.

In some aspects, the image verification device does not apply the image stabilization process to the shared image. In some aspects, the image verification device applies the image stabilization process to only a portion of the shared image. The image verification device utilizes a transfer function based on the measured camera motion information to determine a portion (e.g., a pixel, a group of pixels, a frame of video, and/or the like) of the shared image to which the image stabilization process is not applied (hereafter referred to as the "blurred portion").

In some aspects, the image verification device determines the blurred portion based on an object depicted in the shared image. The image verification device may utilize an object detection model to detect an object depicted in the shared image and/or to determine a location of the object within the shared image. The image verification device may determine the blurred portion based on the object depicted in the shared image and/or the location of the object within the shared image. For example, the blurred portion may be a portion of the shared image that does not include the object and/or that does not include a particular portion of the object (e.g., a signature on a document and/or a monetary amount included on a check, among other examples).

In some aspects, the image verification device determines the blurred portion based on information received from an application used to provide the shared image to another device. For example, a user may utilize an application associated with a financial institution to submit an image of a check to deposit the check in an account of the user. The application may provide information identifying the blurred portion to the image verification device based on the application being used to capture the image of the check. In this way, the application may prevent one or more portions of the check (e.g., a signature line, information identifying an amount of the check, and/or account information, among other examples) from being included in the blurred portion of the shared image.

The image verification device may apply the image stabilization process to a remaining portion of the shared image (hereinafter referred to as the "unblurred portion"). Alternatively, and/or additionally, the image verification device may apply the image stabilization process to the entire shared image and may utilize a blurring function based on the measured camera motion information to determine the blurred portion of the shared image.

As shown by reference number 360, the image verification device includes the measured camera motion information in metadata of the shared image. For example, the image verification device may include the measured camera motion information in the metadata of the shared image to enable the measured camera motion information to be available for verifying the shared image, as described in greater detail below.

In some aspects, the image verification device encrypts the measured camera motion information and includes the encrypted measured camera motion information in the metadata associated with the shared image. The image verification device may generate an encryption key based on the measured camera motion information and may utilize the encryption key to encrypt the measured camera motion information. The image verification device may store the encryption key in the memory associated with the image verification device. In some aspects, the image verification device assigns an image identifier to the true image and associates the stored encryption key with the image identifier.

In some aspects, the image verification device includes information identifying a blurred portion of the shared image in the metadata associated with the shared image. For example, the image verification device may include information identifying a blurred portion of the shared image based on the image verification device applying the image stabilization process to only a portion of the shared image (rather than to the entire shared image) and/or based on utilizing a blurring function to generate the blurred portion of the shared image.

In some aspects, the image verification device encrypts the information identifying the blurred portion of the shared image and includes the encrypted information in the metadata associated with the shared image. For example, the image verification device may generate an encryption key based on the measured camera motion information in a manner similar to that described above and may utilize the encryption key to encrypt the information identifying the blurred portion of the shared image.

In some aspects, the image verification device includes additional information in the metadata associated with the shared image. For example, the image verification device may include the image identifier associated with the true image, information indicating a type of image stabilization process (e.g., OIS, EIS, and/or the like) applied to the true image, information indicating whether the user device was held by the user while the image was captured, information indicating a grip type associated with the user holding the user device while the image was captured, information identifying a location associated with capturing the image, information identifying a user associated with capturing the image, and/or the like.

As shown by reference number 370, the image verification device provides the shared image to another device. For example, the image verification device may provide the shared image to a web server to cause the shared image to be posted to a web site, to a server associated with a financial institution, to another user device, and/or the like.

As indicated above, FIGS. 3A-3B are provided as an example. Other examples may differ from what is described with respect to FIGS. 3A-3B.

Figure 4A:
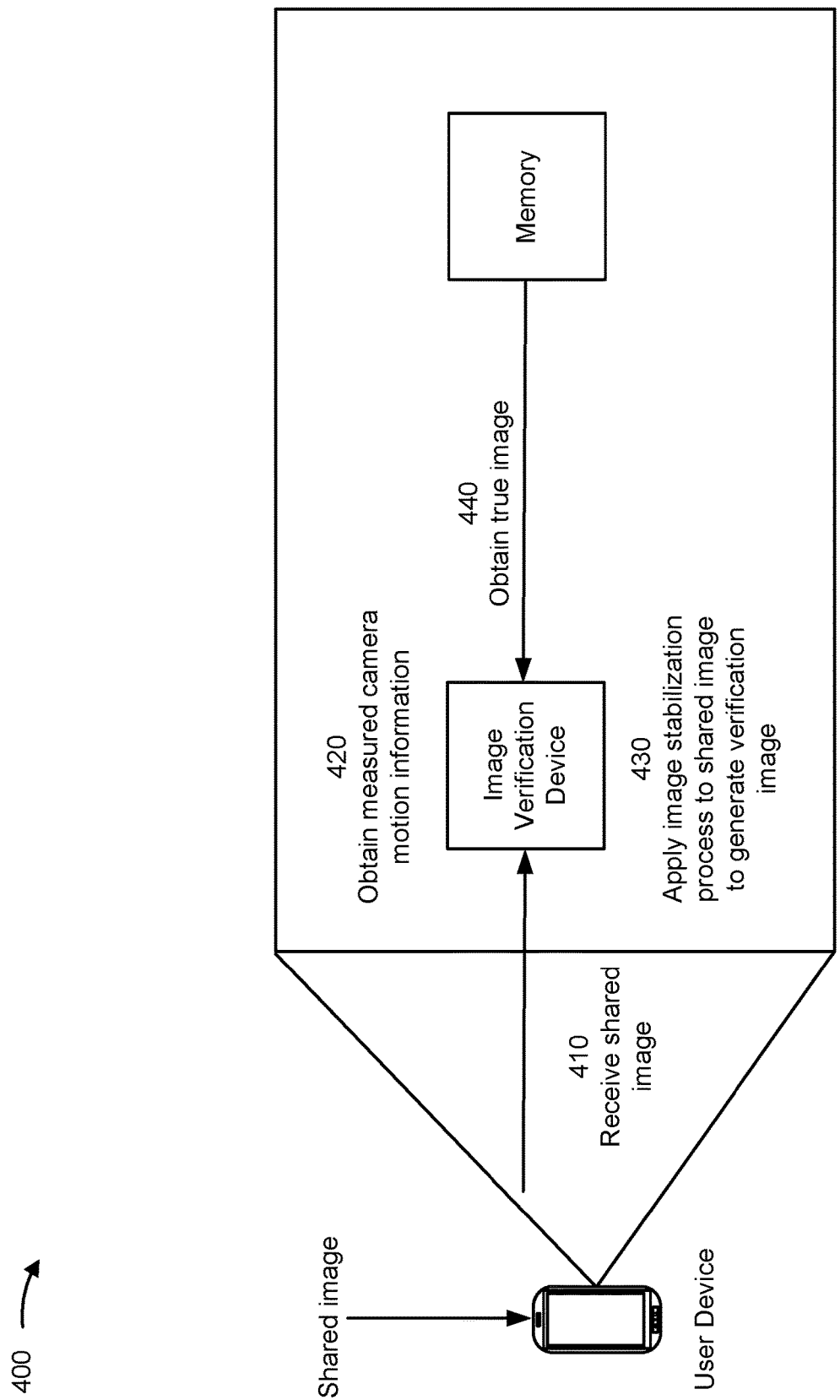
Figure 4B:
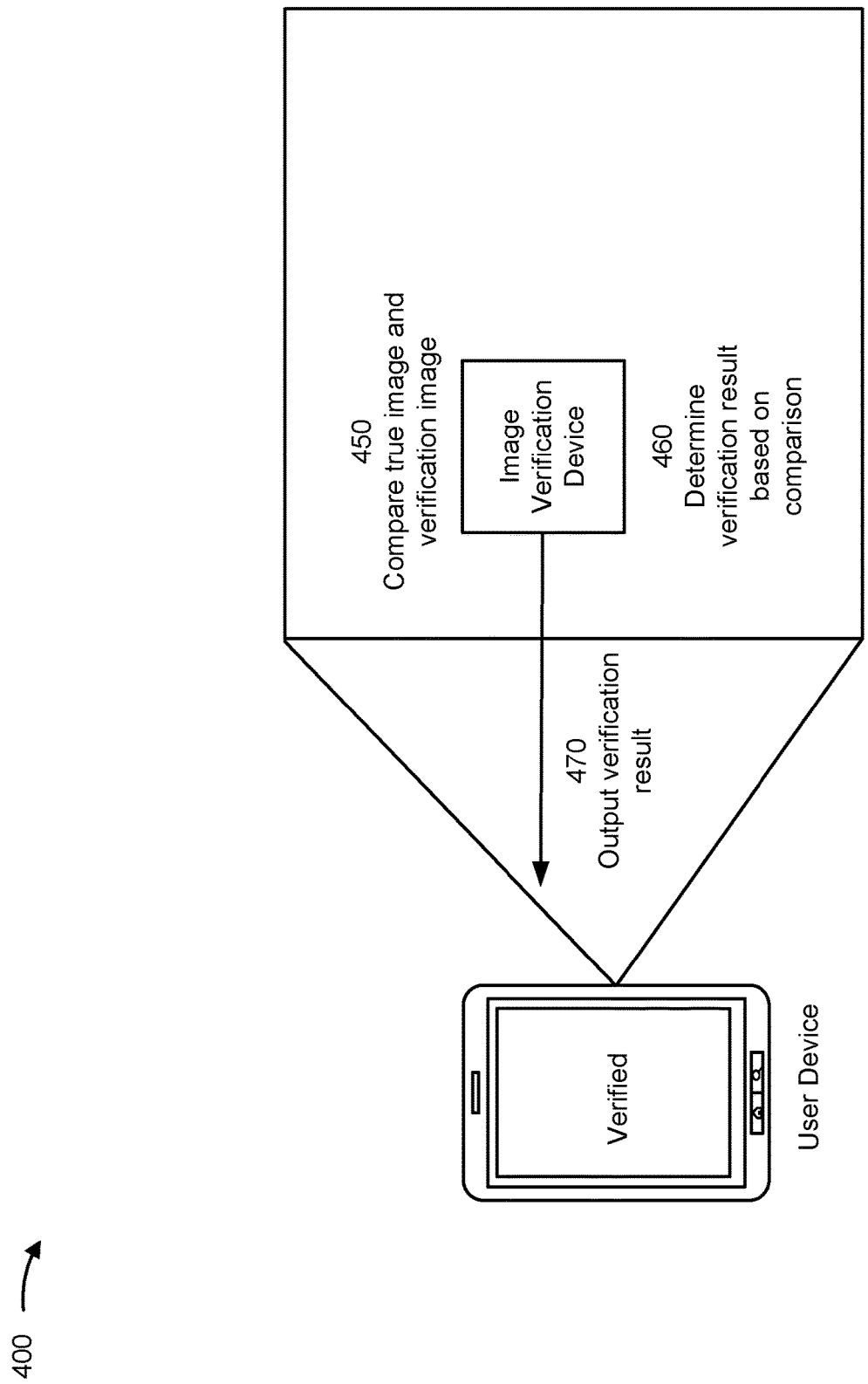

FIGS. 4A-4B are diagrams illustrating an example 400 associated with sensor-based verification of an image, in accordance with the present disclosure. As shown in FIGS. 4A-4B, example 400 includes a user device having an image verification device configured to verify an image.

As shown by reference number 410, the image verification device receives a shared image. The image verification device may receive the shared image from another device. As an example, a financial institution may determine an issue associated with a check depicted in the shared image. The financial institution may identify a user device associated with an account associated with the check and/or a user device from which the shared image was provided. The device associated with the financial institution may provide the shared image to the user device to verify the shared image based on the financial institution determining the issue associated with the check.

As shown by reference number 420, the image verification device obtains measured camera motion information associated with the shared image. For example, the image verification device may obtain the measured camera motion information from metadata associated with the shared image.

In some aspects, the measured camera motion information is encrypted. The image verification device may obtain an image identifier associated with the shared image from the metadata associated with the shared image. The image verification device may utilize the image identifier to obtain an encryption key associated with the encrypted measured camera information from a memory associated with the image verification device. The image verification device may utilize the encryption key to decrypt the measured camera motion information.

As shown by reference number 430, the image verification device applies an image stabilization process to the shared image to generate a verification image. In some aspects, the image verification device determines the image stabilization process to apply to the shared image based on the metadata associated with the shared image. For example, the metadata associated with the shared image may include information indicating a type of image stabilization process applied to the true image, information identifying a blurred portion of the shared image, information indicating that an image stabilization process was applied to the entire image from which the true image was generated and/or to the entire portion of the shared image, information indicating that the blurred portion of the shared image was generated based on a blurring function, and/or the like. The image verification device may generate the verification image based on applying a type of image stabilization process indicated in the metadata to the entire shared image and/or to a blurred portion of the shared image.

As shown by reference number 440, the image verification device obtains the true image associated with the shared image from the memory. For example, the image verification device may obtain the true image associated with the shared image from the memory based on an image identifier included in the metadata associated with the shared image, in a manner similar to that described above with respect to obtaining the encryption key.

As shown in FIG. 4B, and by reference number 450, the image verification device compares the true image and the verification image. In some aspects, the image verification device compares the true image and the verification image based on comparing a set of pixel values (e.g., a luminance value, a magnitude value, and/or the like) of pixels of the verification image to a set of pixel values of corresponding pixels of the true image. The set of pixel values may include pixel values associated with every pixel in the verification image, one or more pixels corresponding to one or more pixels included in a blurred portion of the shared image, one or more pixels corresponding to one or more pixels included in an unblurred portion of the shared image, and/or the like.

As shown by reference number 460, the image verification device determines a verification result based on comparing the true image and the verification image. The image verification device may verify the image based on determining that the image is not a fake image. The image verification device may determine whether the shared image is a fake image based on a percentage of pixel values of pixels of the verification image that match the pixel values of the corresponding pixels of the true image to which the pixel values of the pixels of the verification image were compared. For example, the image verification device may determine that the shared image is a fake image when the percentage of pixel values of pixels of the verification image that match the pixel values of the corresponding pixels of the true image to which they were compared satisfies a threshold (e.g., less than 100%, less than 98%, less than 90%, and/or the like).

As shown by reference number 470, the image verification device outputs the verification result. For example, the image verification device may provide the verification result to a device from which the shared image was received and/or cause information indicating the verification result to be displayed via a display of the user device. The image verification device may output information indicating that the shared image is verified, authentic, and/or not a fake image when the image verification device determines that the shared image is not a fake image. The image verification device may output information indicating that the shared image is not verified, is not authentic, and/or is a fake image when the image verification device determines that the shared image is a fake image.

As indicated above, FIGS. 4A-4B are provided as an example. Other examples may differ from what is described with respect to FIGS. 4A-4B.

Figure 5:
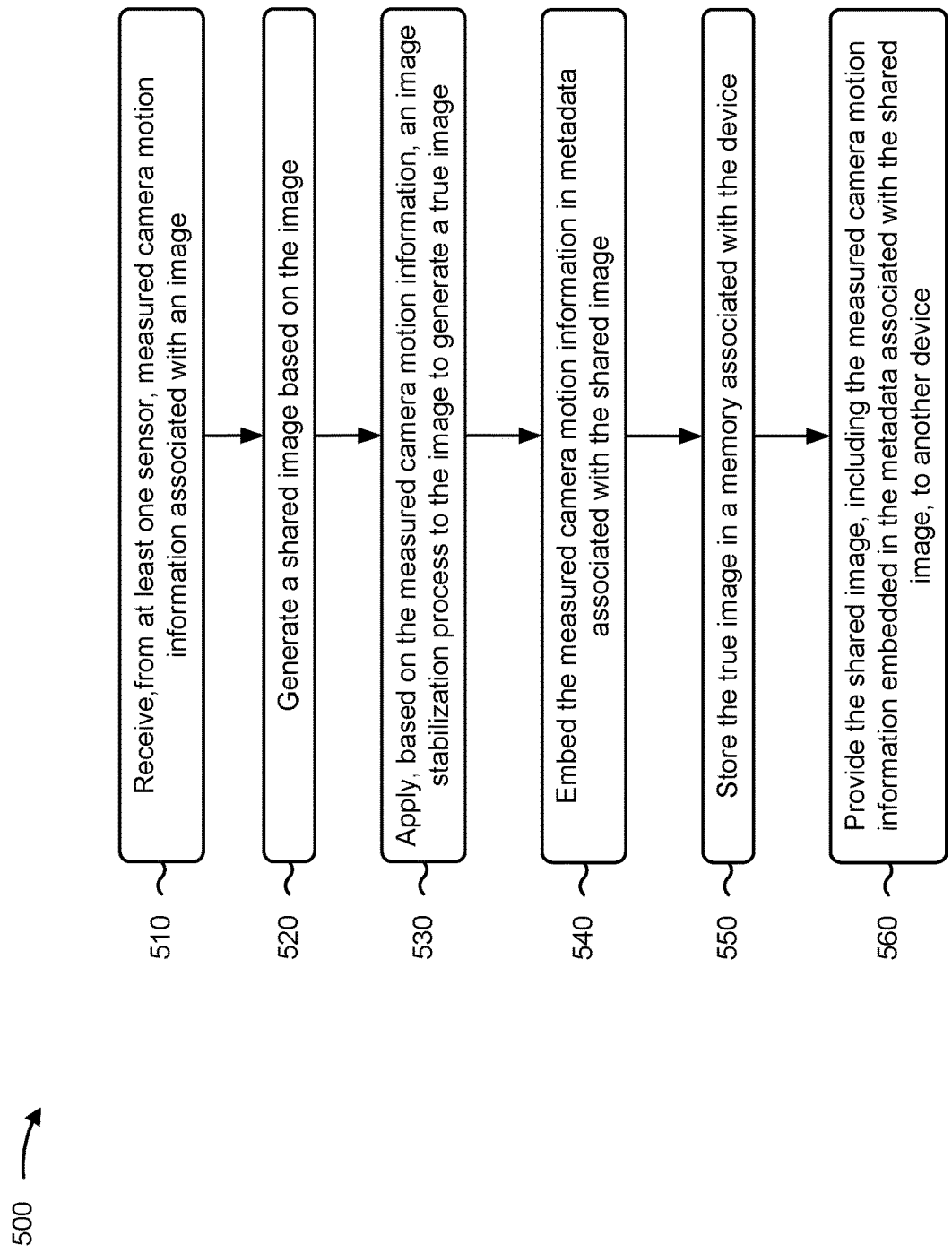
FIG. 5 is a flowchart of an example process associated with sensor-based image verification, in accordance with the present disclosure.

FIG. 5 is a flowchart of an example process 500 associated with sensor-based image verification. In some implementations, one or more process blocks of FIG. 5 may be performed by a device (e.g., user device 110). In some implementations, one or more process blocks of FIG. 5 may be performed by another device or a group of devices separate from or including the device, such as a wireless communication device (e.g., wireless communication device 120). Additionally, or alternatively, one or more process blocks of FIG. 5 may be performed by one or more components of device 200, such as processor 210, memory 215, storage component 220, input component 225, output component 230, communication interface 235, and/or sensor 240.

As shown in FIG. 5, process 500 may include receiving measured camera motion information associated with an image (block 510). For example, the device may receive measured camera motion information associated with an image, as described above.

As further shown in FIG. 5, process 500 may include generating a shared image based on the image (block 520). For example, the device may generate a shared image based on the image, as described above.

As further shown in FIG. 5, process 500 may include applying, based on the measured camera motion information, an image stabilization process to the image to generate a true image (block 530). For example, the device may apply, based on the measured camera motion information, an image stabilization process to the image to generate a true image, as described above.

As further shown in FIG. 5, process 500 may include embedding the measured camera motion information in metadata associated with the shared image (block 540). For example, the device may embed the measured camera motion information in metadata associated with the shared image, as described above.

As further shown in FIG. 5, process 500 may include storing the true image in a memory associated with the device (block 550). For example, the device may store the true image in a memory associated with the device, as described above.

As further shown in FIG. 5, process 500 may include providing the shared image and the measured camera motion information to another device (block 560). For example, the device may provide the shared image and the measured camera motion information to another device, as described above.

Process 500 may include additional implementations, such as any single implementation or any combination of implementations described below and/or in connection with one or more other processes described elsewhere herein.

In a first implementation, process 500 includes receiving the shared image, extracting the measured camera motion information from metadata associated with the shared image, applying, based on the measured camera motion information, the image stabilization process to the shared image to generate a verification image, and determining whether the shared image has been modified based on comparing the verification image and the true image.

In a second implementation, alone or in combination with the first implementation, process 500 includes generating an encryption key based on the measured camera motion information, encrypting the measured camera motion information based on the encryption key, and embedding the encrypted measured camera motion information in metadata associated with the shared image.

In a third implementation, alone or in combination with one or more of the first and second implementations, process 500 includes receiving the shared image, extracting the encrypted measured camera motion information from the metadata associated with the shared image, decrypting the encrypted measured camera motion information based on the encryption key, applying, based on the decrypted measured camera motion information, the image stabilization process to the shared image to generate a verification image, and determining whether the shared image has been modified based on comparing the verification image and the true image.

In a fourth implementation, alone or in combination with one or more of the first through third implementations, process 500 includes determining that a difference between a frame duration associated with capturing the image and an exposure time associated with capturing the image satisfies a threshold, and generating the shared image comprises capturing the shared image during a remaining portion of the frame duration, wherein the remaining portion of the frame duration is subsequent to a portion of the frame duration corresponding to the exposure time.

In a fifth implementation, alone or in combination with one or more of the first through fourth implementations, the measured camera motion information includes one or more of first data indicating an angular velocity of the device during a time period associated with capturing the image, second data indicating an acceleration of the device during the time period associated with capturing the image, third data indicating that the device was held by a user during the time period associated with capturing the image, or fourth data indicating a grip type associated with the user holding the device during the time period associated with capturing the image.

In a sixth implementation, alone or in combination with one or more of the first through fifth implementations, generating the shared image comprises determining a portion of the image to be blurred based on the measured camera motion information, applying the image stabilization process to a remaining portion of the image, and embedding information identifying the portion of the image in metadata associated with the shared image.

In a seventh implementation, alone or in combination with one or more of the first through sixth implementations, the image comprises a plurality of frames, and generating the shared image comprises determining a first frame, of the plurality of frames, to be blurred based on the measured camera motion information, and applying the image stabilization process to a second frame, of the plurality of frames, wherein the image stabilization process is not applied to the first frame.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method, comprising: receiving, by a device, measured camera motion information associated with an image; generating, by the device, a shared image based on the image; applying, by the device and based on the measured camera motion information, an image stabilization process to the image to generate a true image; storing, by the device, the true image in a memory associated with the device; and providing, by the device, the shared image and the measured camera motion information to another device.

Aspect 2: The method of Aspect 1, further comprising: receiving the shared image; extracting the measured camera motion information from metadata associated with the shared image; applying, based on the measured camera motion information, the image stabilization process to the shared image to generate a verification image; and determining whether the shared image has been modified based on comparing the verification image and the true image.

Aspect 3: The method of Aspect 1, alone or in combination with Aspect 2, further comprising: generating an encryption key based on the measured camera motion information; and encrypting the measured camera motion information based on the encryption key; and embedding the encrypted measured camera motion information in metadata associated with the shared image.

Aspect 4: The method of Aspect 3, alone or in combination with one or more of Aspects 1-2, further comprising: receiving the shared image; extracting the encrypted measured camera motion information from the metadata associated with the shared image; decrypting the encrypted measured camera motion information based on the encryption key; applying, based on the decrypted measured camera motion information, the image stabilization process to the shared image to generate a verification image; and determining whether the shared image has been modified based on comparing the verification image and the true image.

Aspect 5: The method of Aspect 1, alone or in combination with one or more of Aspects 2-4, further comprising: determining that a difference between a frame duration associated with capturing the image and an exposure time associated with capturing the image satisfies a threshold; and wherein generating the shared image comprises: capturing the shared image during a remaining portion of the frame duration, wherein the remaining portion of the frame duration is subsequent to a portion of the frame duration corresponding to the exposure time, wherein generating the shared image comprises: capturing the shared image during a remaining portion of the frame duration, wherein the remaining portion of the frame duration is subsequent to a portion of the frame duration corresponding to the exposure time.

Aspect 6: The method of Aspect 1, alone or in combination with one or more of Aspects 2-5, wherein the measured camera motion information includes one or more of: first data indicating an angular velocity of the device during a time period associated with capturing the image; second data indicating an acceleration of the device during the time period associated with capturing the image; third data indicating that the device was held by a user during the time period associated with capturing the image; or fourth data indicating a grip type associated with the user holding the device during the time period associated with capturing the image.

Aspect 7: The method of Aspect 1, alone or in combination with one or more of Aspects 2-6, wherein generating the shared image comprises: determining a portion of the image to be blurred based on the measured camera motion information; applying the image stabilization process to a remaining portion of the image; and embedding information identifying the portion of the image in metadata associated with the shared image.

Aspect 8: The method of Aspect 1, alone or in combination with one or more of Aspects 2-7, wherein generating the shared image comprises: determining a portion of the image to be blurred based on a pre-defined area defined by an application used to provide the shared image to the other device; applying the image stabilization process to a remaining portion of the image; and embedding information identifying the portion of the image in metadata associated with the shared image.

Aspect 9: The method of Aspect 1, alone or in combination with one or more of Aspects 2-8, wherein the image comprises a plurality of frames, and wherein generating the shared image comprises: determining a first frame, of the plurality of frames, to be blurred based on the measured camera motion information; and applying the image stabilization process to a second frame, of the plurality of frames, wherein the image stabilization process is not applied to the first frame.

Aspect 10: An apparatus for wireless communication at a device, comprising a processor; memory coupled with the processor; and instructions stored in the memory and executable by the processor to cause the apparatus to perform the method of one or more Aspects of Aspects 1-9.

Aspect 11: A device for wireless communication, comprising a memory and one or more processors coupled to the memory, the memory and the one or more processors configured to perform the method of one or more Aspects of Aspects 1-9.

Aspect 12: An apparatus for wireless communication, comprising at least one means for performing the method of one or more Aspects of Aspects 1-9.

Aspect 13: A non-transitory computer-readable medium storing code for wireless communication, the code comprising instructions executable by a processor to perform the method of one or more Aspects of Aspects 1-9.

Aspect 14: A non-transitory computer-readable medium storing a set of instructions for wireless communication, the set of instructions comprising one or more instructions that, when executed by one or more processors of a device, cause the device to perform the method of one or more Aspects of Aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, measured camera motion information associated with an image, wherein the measured camera motion information includes one or more of:
      data indicating that the device was held by a user during a time period associated with capturing the image, or
      data indicating a grip type associated with the user holding the device during the time period associated with capturing the image;
   generating, by the device, a shared image;
   applying, by the device and based on the measured camera motion information, an image stabilization process to the image to generate a true image;
   storing, by the device, the true image in a memory associated with the device;

including, by the device and in metadata of the shared image, information indicating a type of the image stabilization process applied to generate the true image; and providing, by the device, the shared image to another device.

2. The method of claim 1, further comprising:
receiving the shared image;
extracting the measured camera motion information from the metadata of the shared image;
applying, based on the measured camera motion information, the image stabilization process to the shared image to generate a verification image; and
determining whether the shared image has been modified based on comparing the verification image and the true image.

3. The method of claim 1, further comprising:
generating an encryption key based on the measured camera motion information;
encrypting the measured camera motion information based on the encryption key; and
embedding the encrypted measured camera motion information in the metadata of the shared image.

4. The method of claim 3, further comprising:
receiving the shared image;
extracting the encrypted measured camera motion information from the metadata of the shared image;
decrypting the encrypted measured camera motion information based on the encryption key;
applying, based on the decrypted measured camera motion information, the image stabilization process to the shared image to generate a verification image; and
determining whether the shared image has been modified based on comparing the verification image and the true image.

5. The method of claim 1, further comprising:
determining that a difference between a frame duration associated with capturing the image and an exposure time associated with capturing the image satisfies a threshold; and
wherein generating the shared image comprises:
capturing the shared image during a remaining portion of the frame duration,
wherein the remaining portion of the frame duration is subsequent to a portion of the frame duration corresponding to the exposure time.

6. The method of claim 1, wherein the measured camera motion information further includes one or more of:
data indicating an angular velocity of the device during the time period associated with capturing the image, or
data indicating an acceleration of the device during the time period associated with capturing the image.

7. The method of claim 1, wherein generating the shared image comprises:
determining a portion of the image to be blurred based on the measured camera motion information;
applying the image stabilization process to a remaining portion of the image; and
embedding information identifying the portion of the image in the metadata of the shared image.

8. The method of claim 1, wherein the image comprises a plurality of frames, and wherein generating the shared image comprises:
determining a first frame, of the plurality of frames, to be blurred based on the measured camera motion information; and applying the image stabilization process to a second frame, of the plurality of frames,
wherein the image stabilization process is not applied to the first frame.

9. A device, comprising:
one or more memories; and
one or more processors, communicatively coupled to the one or more memories, configured to:
receive, from at least one sensor, measured camera motion information associated with an image, wherein the measured camera motion information includes one or more of:
data indicating that the device was held by a user during a time period associated with capturing the image, or
data indicating a grip type associated with the user holding the device during the time period associated with capturing the image;
generate a shared image based on the image;
apply, based on the measured camera motion information, an image stabilization process to the image to generate a true image;
store the true image in a memory associated with the device;
include, in metadata of the shared image, information indicating a type of the image stabilization process applied to generate the true image; and
provide the shared image to another device.

10. The device of claim 9, wherein the one or more processors are further configured to:
receive the shared image;
extract the measured camera motion information from the metadata of the shared image;
apply, based on the measured camera motion information, the image stabilization process to the shared image to generate a verification image; and
determine whether the shared image has been modified based on comparing the verification image and the true image.

11. The device of claim 9, wherein the one or more processors are further configured to:
generate an encryption key based on the measured camera motion information;
encrypt the measured camera motion information based on the encryption key; and
embed the encrypted measured camera motion information in the metadata of the shared image.

12. The device of claim 11, wherein the one or more processors are further configured to:
receive the shared image;
extract the encrypted measured camera motion information from the metadata of the shared image;
decrypt the encrypted measured camera motion information based on the encryption key;
apply, based on the decrypted measured camera motion information, the image stabilization process to the shared image to generate a verification image; and
determine whether the shared image has been modified based on comparing the verification image and the true image.

13. The device of claim 9, wherein the one or more processors are further configured to:
determine that a difference between a frame duration associated with capturing the image and an exposure time associated with capturing the image satisfies a threshold; and wherein the one or more processors, when generating the shared image, are configured to:
  capture the shared image during a remaining portion of the frame duration,
    wherein the remaining portion of the frame duration is subsequent to a portion of the frame duration corresponding to the exposure time.

14. The device of claim 9, wherein the measured camera motion information further includes one or more of:
  data indicating an angular velocity of the device during the time period associated with capturing the image, or
  data indicating an acceleration of the device during the time period associated with capturing the image.

15. The device of claim 9, wherein the one or more processors, when generating the shared image, are configured to:
  determine a portion of the image to be blurred based on a pre-defined area defined by an application used to provide the shared image to the other device;
  apply the image stabilization process to a remaining portion of the image; and
  embed information identifying the portion of the image in the metadata of the shared image.

16. The device of claim 9, wherein the image comprises a plurality of frames,
  wherein the one or more processors, when generating the shared image, are configured to:
    determine a first frame, of the plurality of frames, to be blurred based on the measured camera motion information; and
    apply the image stabilization process to second frame, of the plurality of frames,
      wherein the image stabilization process is not applied to the first frame.

17. The device of claim 9, wherein the measured camera motion information includes the data indicating the grip type associated with the user holding the device during the time period associated with capturing the image.

18. The device of claim 9, wherein the image stabilization process includes one or more of:
  optical image stabilization (OIS), or
  or electronic image stabilization (EIS).

19. The device of claim 9, wherein the image stabilization process includes a first type of stabilization and a second type of stabilization.

20. A non-transitory computer-readable medium storing a set of instructions, the set of instructions comprising:
  one or more instructions that, when executed by one or more processors of a device, cause the device to:
    receive, from at least one sensor, measured camera motion information associated with an image, wherein the measured camera motion information includes one or more of:
      data indicating that the device was held by a user during a time period associated with capturing the image, or
      data indicating a grip type associated with the user holding the device during the time period associated with capturing the image;
    generate a shared image based on the image;
    apply, based on the measured camera motion information, an image stabilization process to the image to generate a true image;
    store the true image in a memory associated with the device;
    include, in metadata of the shared image, information indicating a type of the image stabilization process applied to generate the true image; and
    provide the shared image to another device.

21. The non-transitory computer-readable medium of claim 20, wherein the one or more instructions further cause the device to:
  receive the shared image;
  extract the measured camera motion information from the metadata of the shared image;
  apply, based on the measured camera motion information, the image stabilization process to the shared image to generate a verification image; and
  determine whether the shared image has been modified based on comparing the verification image and the true image.

22. The non-transitory computer-readable medium of claim 20, wherein the one or more instructions further cause the device to:
  determine that a difference between a frame duration associated with capturing the image and an exposure time associated with capturing the image satisfies a threshold; and
  wherein the one or more instructions, that cause the device to generate the shared image, cause the device to:
    capture the shared image during a remaining portion of the frame duration,
      wherein the remaining portion of the frame duration is subsequent to a portion of the frame duration corresponding to the exposure time.

23. The non-transitory computer-readable medium of claim 20, wherein the measured camera motion information further includes one or more of:
  data indicating an angular velocity of the device during the time period associated with capturing the image, or
  data indicating an acceleration of the device during the time period associated with capturing the image.

24. The non-transitory computer-readable medium of claim 20, wherein the one or more instructions further cause the device to:
  determine a portion of the image to be blurred based on the measured camera motion information;
  apply the image stabilization process to a remaining portion of the image; and
  embed information identifying the portion of the image in the metadata of the shared image.

25. The non-transitory computer-readable medium of claim 20, wherein the image comprises a plurality of frames and the one or more instructions to generate the shared image further cause the device to:
  determine a first frame, of the plurality of frames, to be blurred based on the measured camera motion information; and
  apply the image stabilization process to second frame of the plurality of frames,
    wherein the image stabilization process is not applied to the first frame.

26. An apparatus, comprising:
  means for receiving, from at least one sensor, measured camera motion information associated with an image, wherein the measured camera motion information includes one or more of:
    data indicating that the apparatus was held by a user during a time period associated with capturing the image, or data indicating a grip type associated with the user holding the apparatus during the time period associated with capturing the image;
means for generating a shared image based on the image;
means for applying, based on the measured camera motion information, an image stabilization process to the image to generate a true image;
means for storing the true image in a memory associated with the apparatus;
means for including, in metadata of the shared image, information indicating a type of the image stabilization process applied to generate the true image comprises; and
means for providing the shared image to a device.

27. The apparatus of claim 26, further comprising:
means for receiving the shared image;
means for extracting the measured camera motion information from the metadata of the shared image;
means for applying, based on the measured camera motion information, the image stabilization process to the shared image to generate a verification image; and
means for determining whether the shared image has been modified based on comparing the verification image and the true image.

28. The apparatus of claim 26, further comprising:
means for generating an encryption key based on the measured camera motion information;
means for encrypting the measured camera motion information based on the encryption key; and
means for embedding the encrypted measured camera motion information in the metadata of the shared image.

29. The apparatus of claim 28, further comprising:
means for receiving the shared image;
means for extracting the encrypted measured camera motion information from the metadata of the shared image;
means for decrypting the encrypted measured camera motion information based on the encryption key;
means for applying, based on the decrypted measured camera motion information, the image stabilization process to the shared image to generate a verification image; and
means for determining whether the shared image has been modified based on comparing the verification image and the true image.

30. The apparatus of claim 26, further comprising:
means for determining that a difference between a frame duration associated with capturing the image and an exposure time associated with capturing the image satisfies a threshold; and
wherein the means for generating the shared image comprises:
means for capturing the shared image during a remaining portion of the frame duration,
wherein the remaining portion of the frame duration is subsequent to a portion of the frame duration corresponding to the exposure time.

31. The apparatus of claim 26, wherein the measured camera motion information further includes one or more of:
data indicating an angular velocity of the apparatus during the time period associated with capturing the image, or
data indicating an acceleration of the apparatus during the time period associated with capturing the image.

* * * * *